United States Patent
Ou-Yang et al.

(10) Patent No.: US 10,001,407 B2
(45) Date of Patent: Jun. 19, 2018

(54) OPTICAL DETECTING DEVICE

(71) Applicant: NATIONAL CHIAO TUNG UNIVERSITY, Hsinchu (TW)

(72) Inventors: Mang Ou-Yang, Hsinchu (TW); Ting-Wei Huang, Taipei (TW); Hou-Chi Chiang, Hsinchu (TW); Zheng-Lin He, Taichung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days. days.

(21) Appl. No.: 15/375,180

(22) Filed: Dec. 12, 2016

(65) Prior Publication Data
US 2017/0336252 A1 Nov. 23, 2017

(30) Foreign Application Priority Data
May 23, 2016 (TW) .............................. 105115973 A

(51) Int. Cl.
*G01B 11/14* (2006.01)
*G01J 1/42* (2006.01)
(Continued)

(52) U.S. Cl.
CPC .......... *G01J 1/4228* (2013.01); *G01B 11/002* (2013.01); *G01D 5/30* (2013.01)

(58) Field of Classification Search
CPC .......... G01J 1/42; G01J 1/4228; G01B 11/00; G01B 11/002; G01D 5/37; G01D 5/347;
(Continued)

(56) References Cited

U.S. PATENT DOCUMENTS 5,204,524 A 4/1993 Ichikawa et al.
6,603,114 B1 8/2003 Holzapfel et al.
(Continued)

FOREIGN PATENT DOCUMENTS

CN 102455192 A 5/2012
DE 3939905 A1 6/1991
(Continued)

OTHER PUBLICATIONS

W. Gao et al., "Precision nano-fabrication and evaluation of a large area sinusoidal grid surface for a surface encoder," Precision Engineering, vol. 27, 2003, pp. 289-298.
(Continued)

*Primary Examiner* — Jamil Ahmed
(74) *Attorney, Agent, or Firm* — CKC & Partners Co., Ltd.

(57) ABSTRACT

An optical detecting device includes a reflecting element, a main body, a light source and a plurality of photosensitive elements. The reflecting element has a reflecting surface. The main body has an installing surface. The installing surface at least partially faces to the reflecting surface. The main body is configured to move along a moving direction relative to the reflecting element. The moving direction is substantially parallel with the reflecting surface. The light source is disposed on the installing surface and is configured to emit a light ray towards the reflecting surface. The photosensitive elements are disposed on the installing surface. Sides of the photosensitive elements close to the light source surround the light source to form a light source region. The light source is at least partially located in the light source region.

8 Claims, 4 Drawing Sheets

(51) Int. Cl.
  *G01B 11/00* (2006.01)
  *G01D 5/30* (2006.01)
(58) Field of Classification Search
  CPC ..... A61B 5/00; A61B 5/0205; A61B 5/02427;
  A61B 5/024
  See application file for complete search history.

(56) References Cited

U.S. PATENT DOCUMENTS

| | | |
|---|---|---|
| 7,399,956 B2 | 7/2008 | Wong et al. |
| 9,057,485 B2 | 6/2015 | Knox et al. |
| 2006/0124839 A1 | 6/2006 | Lee et al. |
| 2007/0262250 A1* | 11/2007 | Benner .................. G01D 5/347 250/231.13 |
| 2014/0070073 A1 | 3/2014 | Ishizuka et al. |
| 2017/0281027 A1* | 10/2017 | Altmejd ............. A61B 5/02427 |

FOREIGN PATENT DOCUMENTS

| | | |
|---|---|---|
| TW | I241397 | 10/2005 |
| TW | 201351217 | 12/2013 |
| TW | I451212 B | 9/2014 |
| TW | M1521121 U | 5/2016 |

OTHER PUBLICATIONS

W. Gao et al., "Precision Measurement of Two-Axis Positions and Tilt Motions Using a Surface Encoder," Precision Engineering, CIRP Annals—Manufacturing Technology, vol. 52, Issue 1, 2003, pp. 435-438.

* cited by examiner

OPTICAL DETECTING DEVICE

RELATED APPLICATIONS

This application claims priority to Taiwanese Application Serial Number 105115973 filed May 2, 2016, which is herein incorporated by reference.

BACKGROUND

Technical Field

The present disclosure relates to optical detecting devices.

Description of Related Art

With the improvement of electron is technology nowadays, the precision of detecting systems becomes more and more important. Meanwhile the demand for detecting systems of micro-nano levels has been increasing. Therefore, the application of optical detection has become more and more popular.

As a result, how to further enhance the precision of optical detection is undoubtedly an important issue in the industry.

SUMMARY

A technical aspect of the present disclosure provides an optical detecting device which can precisely measure the magnitude of movement in the two-dimensional directions.

According to an embodiment of the present disclosure, an optical detecting device includes a reflecting element, a main body, a light source and a plurality of photosensitive elements. The reflecting element has a reflecting surface. The main body has an installing surface. The installing surface at least partially faces to the reflecting surface. The main body is configured to move along a moving direction relative to the reflecting element. The moving direction is substantially parallel with the reflecting surface. The light source is disposed on the installing surface and is, configured to emit a light ray towards the reflecting surface. The photosensitive elements are disposed on the installing surface. Sides of the photosensitive elements close to the light source surround the light source to form a light source region. The light source is at least partially located in the light source region.

In one or more embodiments of the present disclosure, the reflecting element includes a plurality of protruding structures located on the reflecting surface.

In one or more embodiments of the present disclosure, the photosensitive elements are arranged in a radial pattern around the light source.

In one or more embodiments of the present disclosure, the photosensitive elements are arranged in a spiral pattern around the light source.

In one or more embodiments of the present disclosure, the photosensitive elements are separated from each other.

In one or more embodiments of the present disclosure, the photosensitive elements are mutually connected to form together at least one photosensitive annulus.

In one or more embodiments of the present disclosure, the photosensitive elements form together a plurality of photosensitive annuluses, the centers of photosensitive annuluses are located in the light source region.

In one or more embodiments of the present disclosure, a distance exists between each of the photosensitive annuluses and the adjacent photosensitive annulus.

In one or more embodiments of the present disclosure, the optical detecting device further includes a processor electrically connected with the photosensitive elements.

When compared with the prior art, the above-mentioned embodiments of the present disclosure have at least the following advantages:

(1) Since the light source is at least partially located in the light source region formed by the sides of the photosensitive elements close to the light source and surrounding the light source, when the main body moves along the moving direction relative to the reflecting element, the photosensitive elements are able to receive the light ray reflected by the reflecting surface towards the two-dimensional directions with the variations in the reflecting direction, reflecting angle and/or magnitude. Thus, the optical detecting device is able to achieve the effect of two-dimensional detection, such that the detection by the optical detecting device becomes more precise. Through the reception by the photosensitive elements the light ray reflected by the reflecting surface towards the two-dimensional directions with the variations in the reflecting direction, reflecting angle and/or magnitude, the processor is able to precisely calculate the magnitude of movement of the main body relative to the reflecting element on the plane formed by the axial direction X and the axial direction Y along the moving direction. In other words, the optical detecting device is able to precisely measure the magnitude of movement in the two-dimensional directions.

(2) In the embodiment that each of the photosensitive elements extends on the installing surface along a direction passing through the light source, the photosensitive elements are able to receive light ray with different reflecting angles at the reflecting surface. In other words, when the photosensitive elements receive the light ray reflected by the reflecting surface, the photosensitive elements are not restricted by the reflecting angle of the light ray LR at the reflecting surface.

(3) In the embodiment that the photosensitive elements are mutually connected to form together a photosensitive annulus, the photosensitive elements are able to receive the light ray reflected by the reflecting surface towards different directions. In other words, when the photosensitive elements receive the light ray reflected by the reflecting surface, the photosensitive elements are not restricted by the reflecting direction of the light ray at the reflecting surface.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
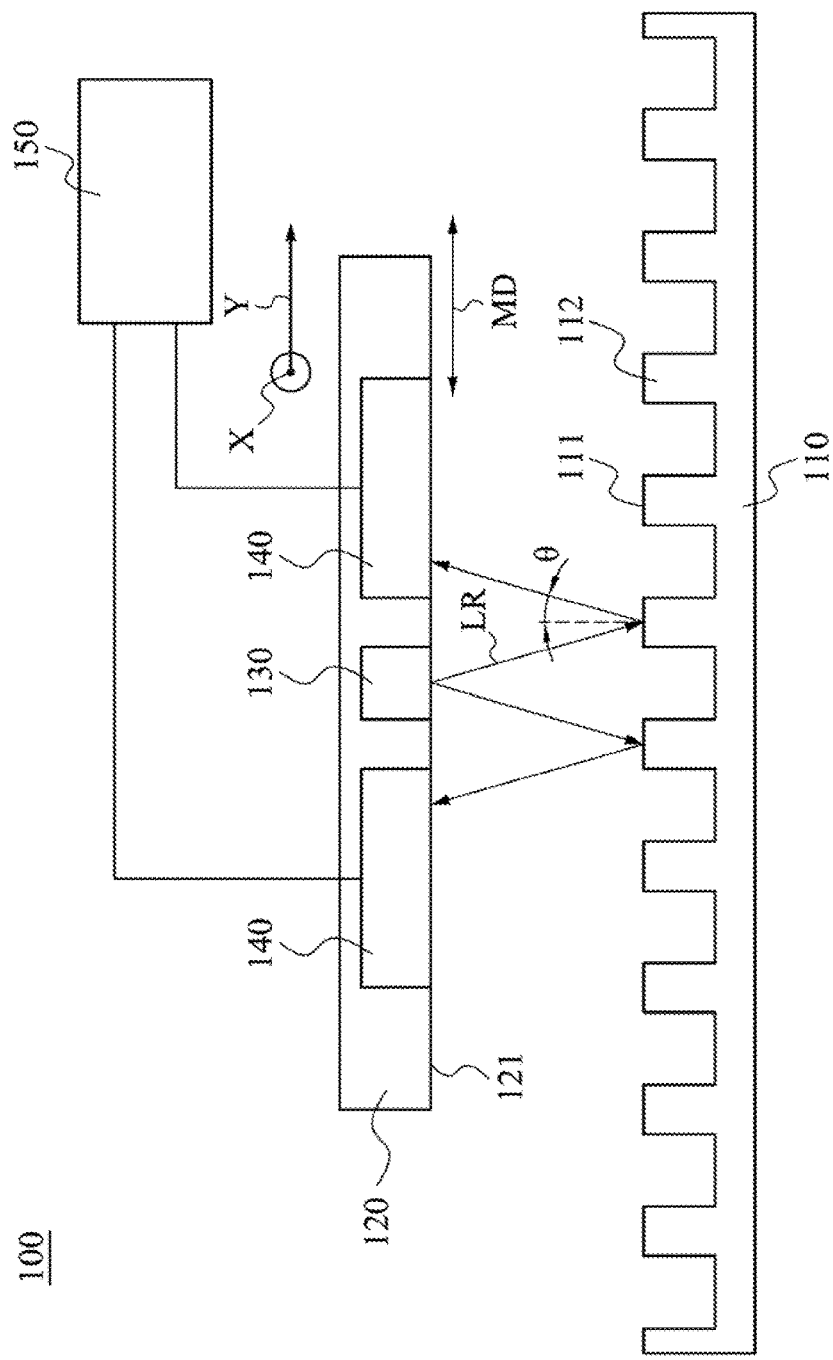
FIG. 1 is a schematic diagram of application of an optical detecting device according to an embodiment of the present disclosure.

Drawings will be used below to disclose a plurality of embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
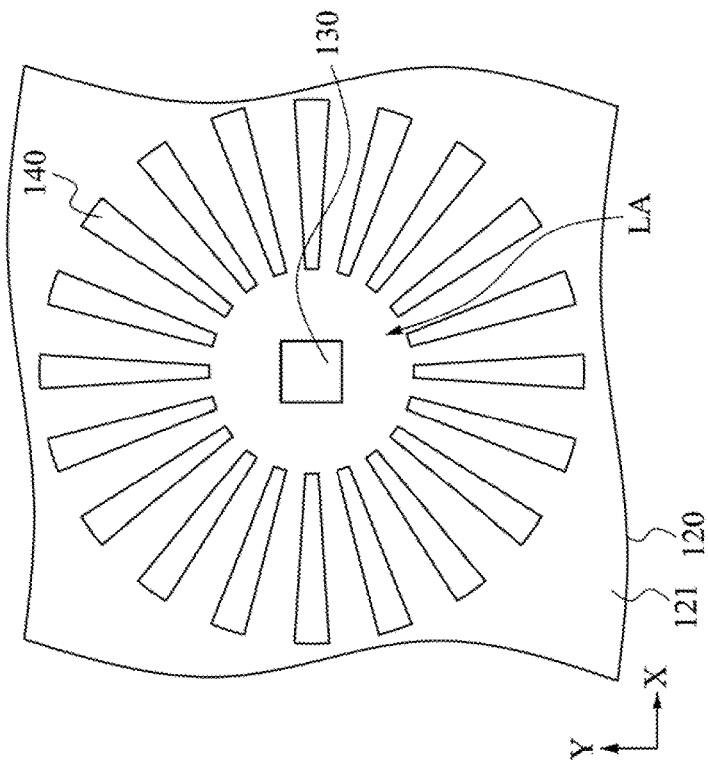
FIG. 2 is a bottom view of the allocation of the photosensitive elements relative to the light source of FIG. 1.

Reference is made to FIG. 1. FIG. 1 is a schematic diagram of application of an optical detecting device 100 according to an embodiment of the present disclosure. As shown in FIG. 1, an optical detecting device 100 includes a reflecting element 110, a main body 120, a light source 130 and a plurality of photosensitive elements 140. The reflecting element 110 has a reflecting surface 111. The main body 120 has an installing surface 121. The installing surface 121 at least partially faces to the reflecting surface 111. The main body 120 is configured to move along a moving direction MD relative to the reflecting element 110. The moving direction MD is substantially parallel with the reflecting surface 111. The light source 130 is disposed on the installing surface 121 and is configured to emit a light ray LR towards the reflecting surface 111 of the reflecting element 110. The photosensitive elements 140 are disposed on the installing surface 121 of the main body 120. Reference is made to FIG. 2. FIG. 2 is a bottom view of the avocation of the photosensitive elements 140 relative to the light source 130 of FIG. 1. As shown in FIG. 2, sides of the photosensitive elements 140 close to the light source 130 surround the light source to form a light source region LA. The light source 130 is at least partially located in the light source region LA.

During the operation of the optical detecting device 100, the light source 130 emits the light ray LR towards the reflecting surface 111 of the reflecting element 110. When the light ray LR reaches the reflecting surface 111, the light ray LR is reflected by the reflecting surface 111 at an reflecting angle θ. The reflecting angle θ is an angle formed between the reflected light ray LR and the normal of the reflecting surface 111. The light ray LR being reflected by the reflecting surface 11 at the reflecting angle θ propagates towards the corresponding photosensitive element 140 and is received by the corresponding photosensitive element 140. As mentioned above, the light source 130 is at least partially located in the light source region LA formed by the sides of the photosensitive elements 140 close to the light source 130 surrounding the light source. In other words, the light source 130 is substantially surrounded by the photosensitive elements 140. In this way, the photosensitive elements 140 are able to receive the light ray LR reflected by the reflecting surface 111 towards different directions, including the axial direction X and the axial direction Y perpendicular to each other. In other words, the optical detecting device 100 is able to achieve the effect of two-dimensional detection (i.e. the axial direction X and the axial direction Y), such that the detection by the optical detecting device 100 becomes more precise. To be more specific, the moving direction MD is located on the plane formed by the axial direction X and the axial direction Y, and the moving direction MD can be the same as the axial direction X or the axial direction Y according to the actual conditions. As shown in FIG. 1, the moving direction MD is the same as the axial direction Y.

To be more specific the reflecting element 110 includes a plurality of protruding structures 112. In this embodiment, the protruding structures 112 are located on the reflecting surface 111. As shown in FIG. 1, the protruding structures 112 are not drawn to the actual scale. For example, the size of the protruding structures 112 is to the magnitudes of micrometer or nanometer. However, this does not intend to limit the present disclosure. When the main body 120 moves along the moving direction MD relative to the reflecting element 110, diffraction will be caused by the light ray LR reaching the reflecting surface 111 with regards to the protruding structures 112 on the reflecting surface 111. Consequently, the optical phenomenon of interference is resulted. As a result, the light ray LR being reflected by the reflecting surface 111 will encounter the variations in the reflecting direction reflecting angle θ and/or magnitude. Optical phenomenon including diffraction and interference are common knowledge in the field and are not to be described here in details.

As mentioned above, the light source 130 is at least partially located in the light source region LA formed by the surrounding of the sides of the photosensitive elements 140 close to the light source 130. In this way, the photosensitive elements 140 are able to receive the light ray LR reflected by the reflecting surface 111 towards different directions with the variations in the reflecting direction, reflecting angle θ and/or magnitude. In other words, the photosensitive elements 140 are able to receive the light ray LR reflected by the reflecting surface 111 towards the axial direction X with the variations in the reflecting direction, reflecting angle θ and/or magnitude. Moreover, the photosensitive elements 140 are also able to receive the light ray LR reflected by the reflecting surface 111 towards the axial direction Y with the variations in the reflecting direction, reflecting angle θ and/or magnitude. In other words, when the main body 120 moves along the moving direction MD relative to the reflecting element 110, the photosensitive elements 140 are able to receive the light ray LR reflected by the reflecting surface 111 towards the two-dimensional directions with the variations in the reflecting direction, reflecting angle θ and/or magnitude. Thus, the optical detecting device 100 is able to achieve the effect of two-dimensional detection, such that the detection by the optical detecting device 100 becomes more precise.

Furthermore, in this embodiment, as shown in FIG. 1, the optical detecting device 100 further includes a processor 150. The processor 150 is electrically connected with the photosensitive elements 140. Through the reception by the photosensitive elements 140 the light ray LR reflected by the reflecting surface 111 towards the two-dimensional directions with the variations in the reflecting direction, reflecting angle θ and/or magnitude, the processor 150 is able to precisely calculate the magnitude of movement of the main body 120 relative to the reflecting element 110 on the plane formed by the axial direction X and the axial direction Y along the moving direction MD. In other words, the optical detecting device 100 is able to precisely measure the magnitude of movement in the two-dimensional directions.

In this embodiment, as shown in FIG. 2, each of the photosensitive elements 140 is in the shape of a fan on the installing surface 121. However, it is noted that the shape of the photosensitive elements 140 on the installing surface 121 as cited herein is only illustrative and is not to limit the claimed scope. A person having ordinary skill in the art of the present invention should, depending on actual conditions, suitably choose the shape of the photosensitive elements 140 on the installing surface 121, such as circle, ellipse, rectangle, square, rhombus and other polygons.

To be more specific, as shown in FIG. 2, the photosensitive elements 140 are arranged in a radial pattern around the light source 130. In other words, the light source 130 is located in the photosensitive elements 140 arranged in the radial pattern. Moreover, the photosensitive elements 140 are separated from each other. This means that there s no physical contact between the photosensitive elements 140. In this way, according to the actual conditions, the user can make the photosensitive elements 140 receive the light ray LR reflected by the reflecting surface 111 at a specific direction.

In addition, in this embodiment, as shown in FIG. 2, each of the photosensitive elements 140 extends on the installing surface 121 along a direction passing through the light source 130. In this way, the photosensitive elements 140 are able to receive light ray LR with different reflecting angles θ at the reflecting surface 111. In other words, when the photosensitive elements 140 receive the light ray LR reflected by the reflecting surface 111, the photosensitive elements 140 are not restricted by the reflecting angle θ of the light ray LR at the reflecting surface 111.

In practical applications, the photosensitive elements 140 are evenly distributed around the light source 130. Meanwhile, the quantity of the photosensitive elements 140 can be configured to be odd number or even number according to the actual conditions.

In practical applications, the light source 130 can be light-emitting diode (LED), laser diode or vertical-cavity surface mating laser (VCSEL), etc. However, these choices of light source 130 do not intend to limit the present disclosure.

Figure 3:
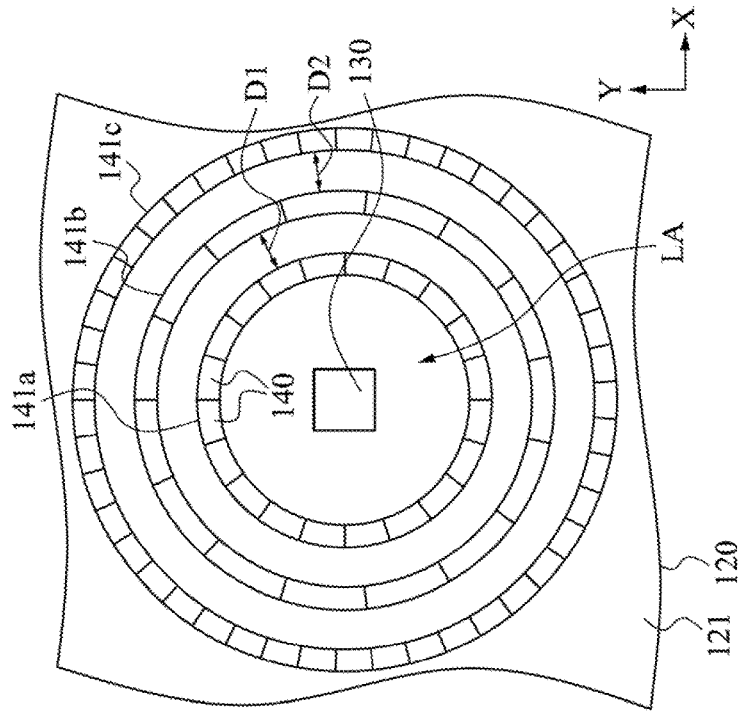
FIG. 3 is a bottom view of the allocation of photosensitive elements relative to a light source according to another embodiment of the present disclosure.

Reference is made to FIG. 3. FIG. 3 is a bottom view of the allocation of photosensitive elements 140 relative to a light source 130 according to another embodiment of the present disclosure. As shown in FIG. 3, the photosensitive elements 140 are mutually connected to form together a photosensitive annulus 141a. In this way, the photosensitive elements 140 are able to receive the light, ray LR reflected by the reflecting surface 111 towards different directions. In other words, in this embodiment, when the photosensitive elements 140 receive the light ray LR reflected by the reflecting surface 111, the photosensitive elements 140 are not restricted by the reflecting direction of the light ray LR at the reflecting surface 111.

Furthermore, the photosensitive elements 140 can also form together a plurality of photosensitive annuluses. The quantity of the photosensitive elements 140 on each of the photosensitive annuluses can be designed to be the same or different according to the actual conditions, in this embodiment, as shown in FIG. 3, the quantity of the photosensitive annuluses three, including the photosensitive annuluses 141a, 141b, 141c, and the centers of the photosensitive annuluses 141a, 141b, 141c are located in the light source region LA. For example, the quantities of the photosensitive elements 140 on the photosensitive annuluses 141a, 141b, 141c are different from each other. As shown in FIG. 3, the photosensitive elements 140 forming the photosensitive annulus 141c are more than the photosensitive elements 140 forming the photosensitive annulus 141b, and the photosensitive elements 140 forming the photosensitive annulus 141b are more than the photosensitive elements 140 forming the photosensitive annulus 141a. On the other hand, a distance exists between each of the photosensitive annuluses and the adjacent photosensitive annulus. To be more specific, a distance D1 exists between the photosensitive annulus 141a and the photosensitive annulus 141b, and a distance D2 exists between the photosensitive annulus 141b and the photosensitive annulus 141c. As a result, apart from making the photosensitive elements 140 to be able to receive the light ray LR reflected by the reflecting surface 111 towards different directions, according to actual conditions, the user can make the photosensitive elements 140 to be able to receive the light ray LR reflected by the reflecting surface 111 at a specific reflecting angle θ.

Figure 4:
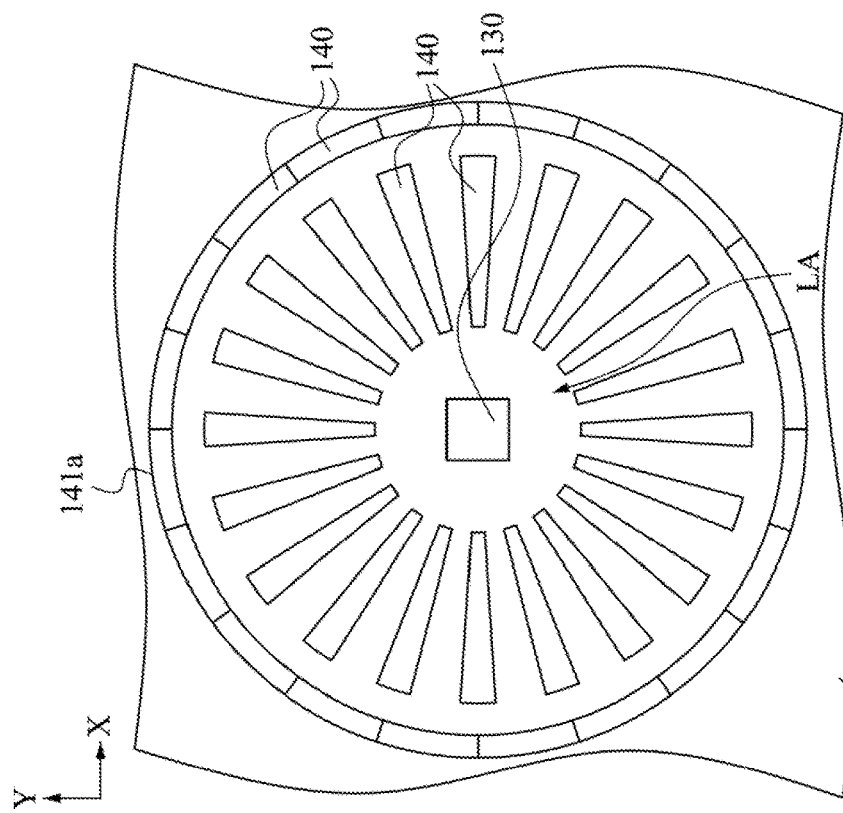
FIG. 4 is a bottom view of the allocation of photosensitive elements relative to a light source according to a further embodiment of the present disclosure.

Reference is made to FIG. 4. FIG. 4 is a bottom view of the allocation of photosensitive elements 140 relative to a light source 130 according to a further embodiment of the present disclosure. In this embodiment, as shown in FIG. 4, the user can make the photosensitive elements 140 close to the light source 130 mutually connected to from together the photosensitive annulus 141a, and the photosensitive elements 140 away from the light source 130 separated from each other, such that the application of the optical detecting device 100 becomes more flexible.

Figure 5:
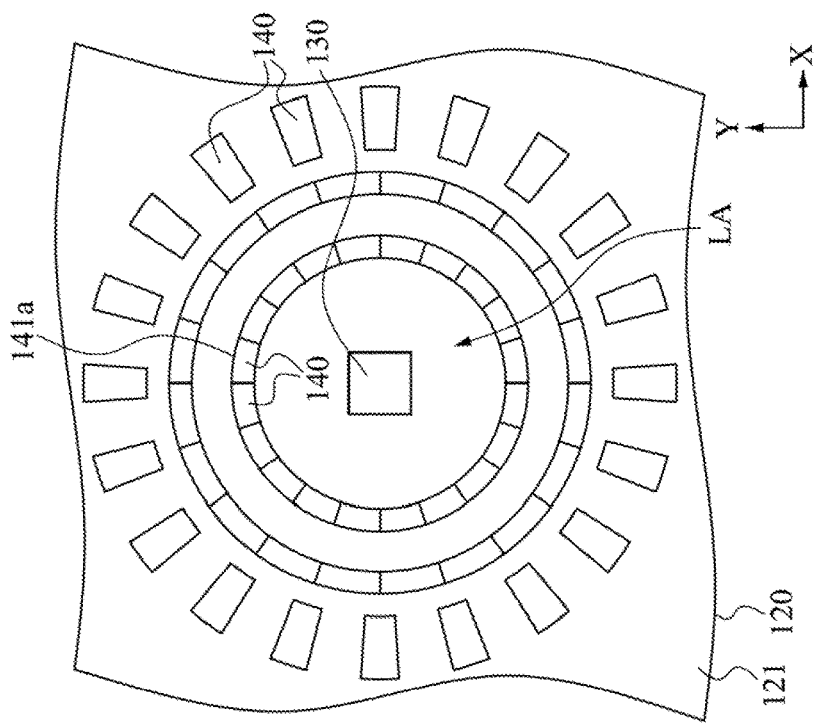
FIG. 5 is a bottom view of the allocation of photosensitive elements relative to a light source according to another embodiment of the present disclosure.

Reference is made to FIG. 5. FIG. 5 is a bottom view of the allocation of photosensitive elements 140 relative to a light source 130 according to another embodiment of the present disclosure. Relatively speaking, in this embodiment, as shown in FIG. 5, according to the actual conditions, the user can make the photosensitive elements 140 close to the light source 130 separated from each other, and the photosensitive elements 140 away from the light source 130 mutually connected to from the photosensitive annulus 141a, such that the application of the optical detecting device 100 becomes more flexible.

Figure 6:
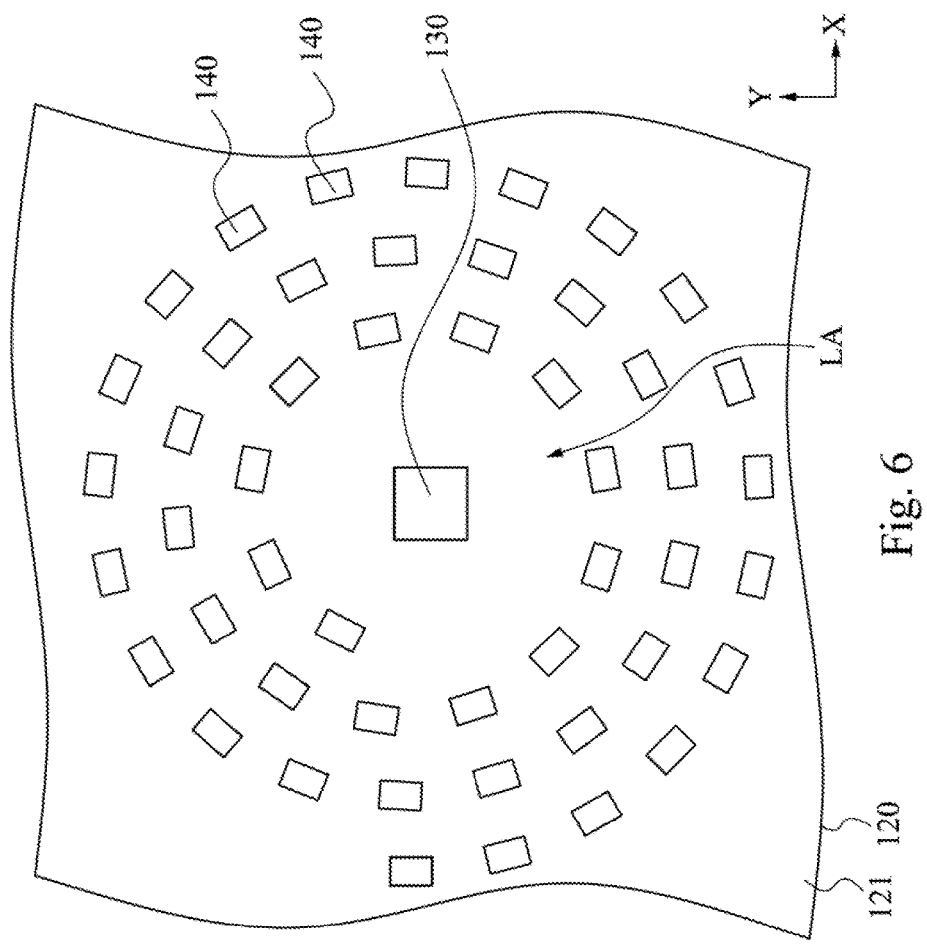
FIG. 6 is a bottom view of the allocation of photosensitive elements relative to a light source according to a further embodiment of the present disclosure.

Reference is made to FIG. 6. FIG. 6 is a bottom view of the allocation of photosensitive elements 140 relative to a light source 130 according to a further embodiment of the present disclosure. In this embodiment, as shown in FIG. 6, according to the actual conditions, the user can make the photosensitive elements 140 arranged in a spiral pattern on the installing surface 121 around the light source 130. In this way, the application of the optical detecting device 100 becomes more flexible.

In summary, when compared with the prior art, the embodiments of the present disclosure mentioned above have at least the following advantages:

(1) Since the light source is at least partially located in the light source region formed by the sides of the photosensitive elements close to the light source, which sides surround the light source, when the main body moves along the moving direction relative to the reflecting element, the photosensitive elements are able to receive the light ray reflected by the reflecting surface towards the two-dimensional directions with the variations in the reflecting direction, reflecting angle and/or magnitude. Thus, the optical detecting device is able to achieve the effect of two-dimensional detection, such that the detection by the optical detecting device becomes more precise. Through the reception by the photosensitive elements the light ray reflected by the reflecting surface towards the two-dimensional directions with the variations in the reflecting direction, reflecting angle and/or magnitude, the processor is able to precisely calculate the magnitude of movement of the main body relative to the reflecting element on the plane formed by the axial direction X and the axial direction Y along the moving direction. In other words the optical detecting device is able to precisely measure the magnitude of movement in the two-dimensional directions.

(2) In the embodiment that each of the photosensitive elements extends on the installing ace along a direction passing through the light source, the photosensitive elements are, able to receive light ray with different reflecting angles at the reflecting surface. In other words, when the photosensitive elements receive the light ray reflected by the reflecting surface, the photosensitive elements are not restricted by the reflecting angle of the light ray LR at the reflecting surface.

(3) In the embodiment that the photosensitive elements are mutually connected to form together a photosensitive annulus, the photosensitive elements are able to receive the light ray reflected by the reflecting surface towards different directions. In other words, when the photosensitive elements receive the light ray reflected by the reflecting surface, the photosensitive elements are not restricted by the reflecting direction of the light ray at the reflecting surface.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An optical detecting device, comprising:
   a reflecting element having a reflecting surface;
   a main body having an installing surface, the installing surface at least partially facing to the reflecting surface, the main body being configured to move along a moving direction relative to the reflecting element, the moving direction being substantially parallel with the reflecting surface;
   a light source disposed on the installing surface and configured to emit a light ray towards the reflecting surface; and
   a plurality of photosensitive elements disposed on the installing surface in a radial pattern symmetrically and circularly around the light source, each of the photosensitive elements being in a fan shape and able to receive light reflected by the reflecting surface at a specific angle, sides of the photosensitive elements close to the light source surrounding the light source to form a light source region, the light source being at least partially located in the light source region.

2. The optical detecting device of claim 1, wherein the reflecting element comprises a plurality of protruding structures located on the reflecting surface.

3. The optical detecting device of claim 1, wherein the photosensitive elements are separated from each other.

4. The optical detecting device of claim 1, wherein the photosensitive elements are mutually connected to form together at least one photosensitive annulus.

5. The optical detecting device of claim 4, wherein the photosensitive elements form together a plurality of photosensitive annuluses, the centers of photosensitive annuluses are located in the light source region.

6. The optical detecting device of claim 5, wherein a distance exists between each of the photosensitive annuluses and the adjacent photosensitive annulus.

7. The optical detecting device of claim 1, further comprising a processor electrically connected with the photosensitive elements.

8. An optical detecting device, comprising:
   a reflecting element having a reflecting surface;
   a main body having an installing surface, the installing surface at least partially facing to the reflecting surface, the main body being configured to move along a moving direction relative to the reflecting element, the moving direction being substantially parallel with the reflecting surface;
   a light source disposed on the installing surface and configured to emit a light ray towards the reflecting surface; and
   a plurality of photosensitive elements disposed on the installing surface in a spiral pattern around the light source and able to receive light reflected by the reflecting surface toward a two dimensional directions with the variation in the reflecting direction, reflecting angle and/or magnitude, sides of the photosensitive elements close to the light source surrounding the light source to form a light source region, the light source being at least partially located in the light source region.

* * * * *